US009469236B2

(12) United States Patent
Nicholson et al.

(10) Patent No.: US 9,469,236 B2
(45) Date of Patent: Oct. 18, 2016

(54) SYSTEM AND METHOD FOR PERFORMING AN OPERATION IN AT LEAST TWO INDIVIDUALLY TRANSPORTED WORK SPACES

(71) Applicants: Peter Nicholson, Cypress, TX (US); Sean Lynch, Woodlands, TX (US)

(72) Inventors: Peter Nicholson, Cypress, TX (US); Sean Lynch, Woodlands, TX (US)

(*) Notice: Subject to any disclaimer, the term of this patent is extended or adjusted under 35 U.S.C. 154(b) by 0 days.

(21) Appl. No.: 14/579,570

(22) Filed: Dec. 22, 2014

(65) Prior Publication Data

US 2015/0176758 A1 Jun. 25, 2015

Related U.S. Application Data

(60) Provisional application No. 61/920,017, filed on Dec. 23, 2013.

(51) Int. Cl.
*B60P 3/14* (2006.01)
*B23P 21/00* (2006.01)
*F16L 58/00* (2006.01)

(52) U.S. Cl.
CPC .............. *B60P 3/14* (2013.01); *B23P 21/004* (2013.01); *F16L 58/00* (2013.01)

(58) Field of Classification Search
CPC .................................. B60P 3/025; B60P 3/14
USPC ..... 296/26.08, 24.32; 280/638, 656, DIG. 8, 280/418.1; 52/64; 220/1.5
See application file for complete search history.

(56) References Cited

U.S. PATENT DOCUMENTS

| | | | | |
|---|---|---|---|---|
| 3,073,466 A * | 1/1963 | Greer | ................... | B60P 7/13 220/1.5 |
| 4,215,809 A * | 8/1980 | Davis | ................... | B23K 9/048 219/76.14 |
| 4,546,969 A * | 10/1985 | Wilson | ................. | B60P 3/0252 296/186.1 |
| 8,505,684 B1 * | 8/2013 | Bogue | ................... | B66F 11/042 182/19 |
| 8,931,323 B2 * | 1/2015 | Kaminsky | ............... | B21C 37/09 72/363 |
| 2007/0182182 A1 * | 8/2007 | Hall | ..................... | B60P 3/14 296/24.32 |
| 2015/0216296 A1 * | 8/2015 | Mitchell | ................. | A47B 9/00 108/21 |

OTHER PUBLICATIONS

HTTPS://www.google.com/?gws rd=ssl#q=on+site+pipe+cladding, Arcspecialties.com website, Tri-Pulse Pipe Cladding System.*
Industrial Solutions and Innovation, LLC, "AMET Advanced Automated Welding Systems Welding critical components throughout the world", Copyrighted Materials. © 2015, 9 pgs. (Brochure).
ARC Specialties, Inc., 'Automated Manufacturing Systems', http://arcspecialties.com/?portfolio=tri-pulse-pipe-cladding-system, Copyright 2014, downloaded Dec. 17, 2014, 5 pgs.

(Continued)

*Primary Examiner* — Dennis H Pedder
(74) *Attorney, Agent, or Firm* — Abel Law Group, LLP; Angel Herrera, Jr.

(57) ABSTRACT

A system including a first transportable element having a first work space; and a second transportable element having a second work space, wherein the first and second work spaces each contain a portion of an equipment, wherein all of the equipment is contained in the first and second work spaces, and wherein the first and second work spaces are alignable with one another at a worksite such that the equipment can perform an assembly operation at the worksite, the assembly operation including performance of at least one step performed in the first work space and at least one step performed in the second work space.

13 Claims, 3 Drawing Sheets

(56) References Cited

OTHER PUBLICATIONS

Fronius Shifting the Limits, Pipe Cladding Flyer, vol. 1, 2012, 1pg.
The Welding Camera Blog, 'Internal (bore) cladding in the oil and gas industry', http://www.melttools.com/blog/internal-cladding-in-the-oil-and-gas-industry, downloaded Dec. 17, 2014, 3 pgs.
Weld Cladding Overlay, The process and equipment needed, 'Westermans International, http://www.westermans.com/weldcladding.aspx, Copyright 2006-2013, 3 pgs.
Welding Manipulators & Peripherals—Polysoude, http://us.polysoude.com/welding-manipulators-a-peripherals/blog, downloaded Dec. 17, 2014, 3 pgs.
TriPulse Pipe Cladding System Video, https://www.youtube.com/watch?v=750BJgqTJ-4, Published on Jun. 12, 2014.
Pipe Cladding—Automation—Saldatura—Fronius, https://www.youtube.com/watch?v=g69lQG-rED8, Published on May 6, 2016.
Fronius Automation FOW TIG Hotwire & CMT / FOW WIG Heiβdraht & CMT, https://www.youtube.com/watch?v=AXZvNFuHPp0, Published on Nov. 19, 2015.

* cited by examiner

SYSTEM AND METHOD FOR PERFORMING AN OPERATION IN AT LEAST TWO INDIVIDUALLY TRANSPORTED WORK SPACES

CROSS-REFERENCE TO RELATED APPLICATION

This application claims priority under 35 U.S.C. §119(e) to U.S. Provisional Application No. 61/920,017, entitled "Containerized Clad Lined Pipe", by Peter Nicholson and Sean Lynch, filed Dec. 23, 2013, which assigned to the current assignee hereof and incorporated herein by reference in its entirety.

FIELD OF THE DISCLOSURE

The present disclosure relates to systems for performing an assembly operation, and more particularly to mobile systems and methods for performing an assembly operation in at least two individually transported work spaces.

RELATED ART

Crude oil, sometimes referred to simply as "crude," is generally classified based on physical characteristics and chemical composition using terms such as "sweet" or "sour," and "light" or "heavy." Sweet crude requires the least energy to extract from geological formations and once extracted, yields a higher quality and quantity of gasoline. Sour crude, on the other hand, has a high level of impurity, namely sulfur, which must be removed before being processed into gasoline. During oil extraction and processing, these impurities can wear and damage pipes and equipment, resulting in shorter operational life expectancy.

Some estimate that up to 70 percent of the world's remaining oil reserves consist of sour crude oil, high in sulfur or $CO_2$ content which damages pipes. Thus, the need to protect pipes from the corrosive effects of corrosive impurities is increasing and the oil and gas industry demands improved systems and techniques.

BRIEF DESCRIPTION OF THE DRAWINGS

Embodiments are illustrated by way of example and are not limited in the accompanying figures.

DETAILED DESCRIPTION

Figure 1:
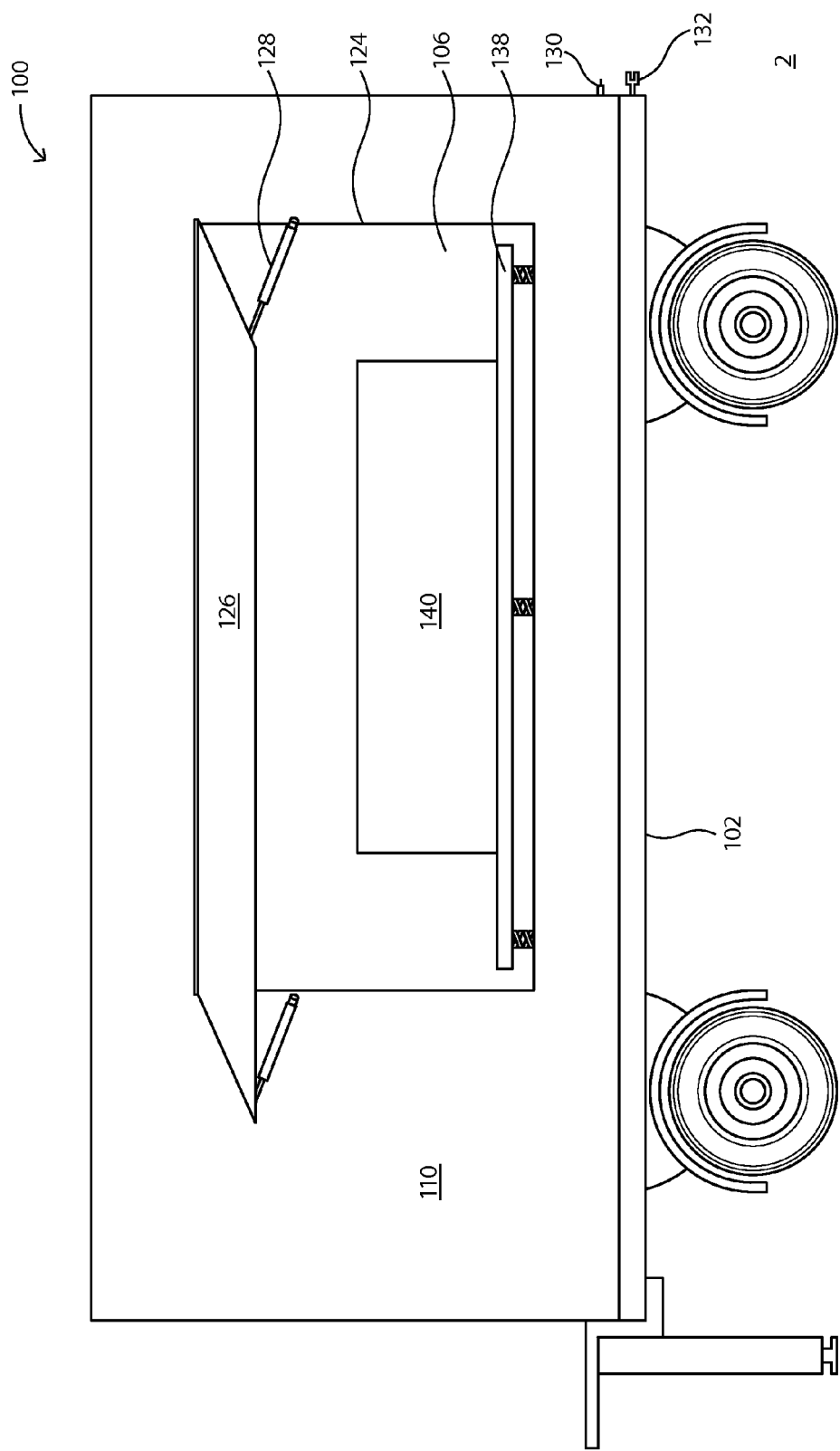
FIG. 1 includes a schematic view of a system in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but can include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item can be used in place of a single item. Similarly, where more than one item is described herein, a single item can be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and can be found in textbooks and other sources within the mobile deployment and pipe cladding arts.

In accordance with one or more embodiments disclosed herein, a system can generally include a first transportable element comprising a first work space and a second transportable element comprising a second work space. The first and second work spaces can each include a portion of equipment. In an embodiment, the first and second work spaces are alignable with one another such that the equipment can perform an assembly operation at a worksite. The assembly operation can include at least one step performed in the first work space and at least one step performed in the second work space. In a particular embodiment, the equipment can include a pipe cladding assembly. More particularly, a pipe rotator can be positioned in the first work space and a welding carriage can be positioned in the second work space.

In accordance with one or more embodiments disclosed herein, a mobile pipe cladding system can generally include a first mobile platform comprising a first work space, and a second mobile platform comprising a second work space. The first and second work spaces can define a work cell, where at least one pipe cladding component is disposed within the work cell. In an embodiment, the first and second mobile platforms are adapted to be aligned and leveled at a work site.

Figure 2:
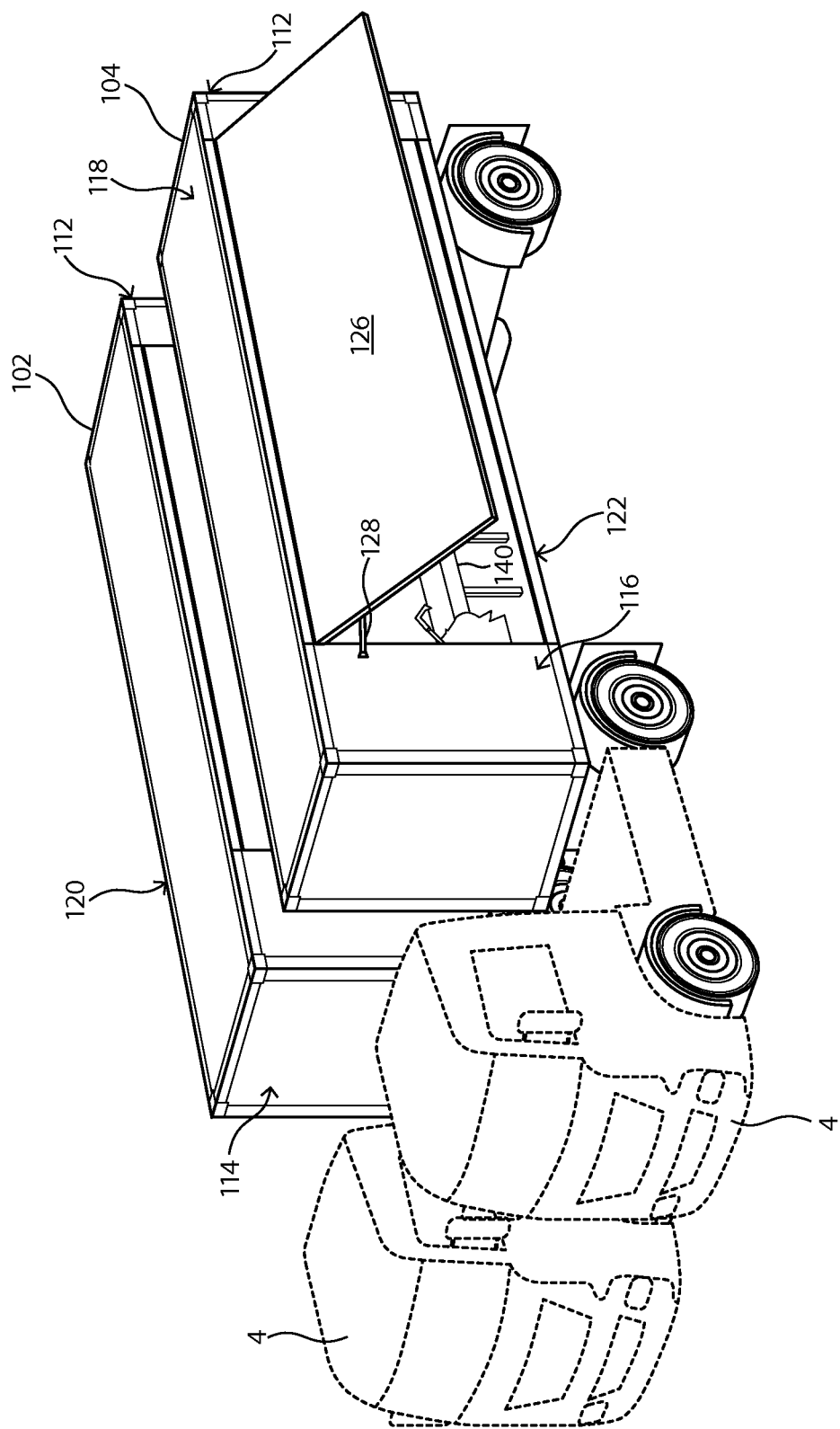
FIG. 2 includes a perspective view of transportable elements in accordance with an embodiment prior to deployment at a work site.

Referring to FIGS. 1 and 2, a system 100 in accordance with one or more embodiments described herein can generally include a transportable element 102 and a transportable element 104 (FIG. 2). Transportable elements 102 and 104 can have the same or generally similar features as one another. Thus, as described herein, one or more features described with respect to one of transportable elements 102 or 104 can be present in the other of transportable elements 102 or 104.

Transportable elements 102 and 104 can be rapidly deployable to a work site 2 where they can be aligned with one another and leveled so as to be capable of performing an operation having steps performed in both transportable elements 102 and 104. In such a manner, the transportable elements 102 and 104 can each house, transport, and store a portion of equipment 140 being used to conduct an operation at the work site 2. In a particular embodiment, the transportable elements 102 and 104 can each include a mobile platform, such as for example, a flat bed trailer. In an embodiment, at least one of the transportable elements 102 or 104 can further include a fifth wheel engagement or other suitable coupling mechanism for engaging with a towing vehicle 4 (FIG. 2).

In an embodiment, the transportable elements 102 and 104 can include a transportation permitting element such as road or railway wheels, skis or sleds, pontoons, wings, or the like. In another embodiment, the transportable elements 102 and 104 can instead include, for example, a shipping container, a crate, or another similar movable object not including self-contained transportation permitting elements. Rather, these transportable elements can include any one of hooks, loops, rails, or the like for use with, for example, cranes, lifts, pulleys, or other lifting mechanisms. The containers and crates can be loaded and transported via rail, road, water, air, or any combination thereof to the work site 2.

Each transportable element 102 and 104 can define a work space 106 and 108, respectively. The combination of work spaces 106 and 108 can form a work cell, i.e., a single work space separated during transportation and brought together to perform an operation at the work site 2.

In an embodiment, at least one of the work spaces 106 or 108 can be at least partially enclosed, for example by a housing 110 which can protect the work space 106 or 108 from environmental debris, precipitation, or other harmful exposure. In a particular embodiment, each housing 110 can define sides 112, 114, 116, 118, 120, and 122. In an embodiment, at least one of the sides 112, 114, 116, 118, 120, and 122 can be collapsible or removable, permitting disassembly of the housing 110.

In an embodiment, the housing 110 can include a metal, such as for example, a corrugated metal, or a polymer. The housing 110 can be coupled with an underlying carriage, frame, or other similar support assembly. The carriage, frame, or other similar support assembly can enhance structural rigidity of the transportable elements 102 or 104.

An aperture 124 can extend along at least one side 112, 114, 116, 118, 120, or 122 of the housing 110, opening the work spaces 106 or 108 to the work site 2. The aperture 124 can be shaped and sized to accommodate transverse passage of a pipe segment into the work space 106 or 108. As pipe segments can vary in length between 5 feet and 50 feet, the aperture 124 can similarly vary in size. In an embodiment, the aperture 124 can be selectively adjustable, e.g., having folding or collapsing panels, foldable fabric, or another similar adjustable mechanism. In this regard, the aperture 124 can be selectively sized for particular applications without requiring significant retooling or use of a permanently sized aperture 124.

In an embodiment, the aperture 124 can be selectively closed by a door 126. In a more particular embodiment, the door 126 can be pivotally movable about a horizontal axis. That is, the door 126 can be capable of pivoting in the vertical direction. An actuator 128, such as for example, a hydraulic or electromechanical actuator, can selectively move the door 126 between open and closed positions. Actuator engagement can be performed by one or more controls located in the transportable element 102 or 104, the towing vehicle 4, wired or wireless remote, or by any combination thereof.

In an embodiment, the housing 110 can have a length, $L_H$, greater than a length, $L_A$, of the aperture 124. For example, $L_H$ can be at least 1.01 $L_A$, such as at least 1.05 $L_A$, at least 1.1 $L_A$, or even at least 1.2 $L_A$. In an embodiment, $L_A$ can be at least 0.25 $L_H$, such as at least 0.5 $L_H$, at least 0.75 $L_H$, or even at least 0.9 $L_H$. In a particular embodiment, $L_A$ can be at least 5 feet, such as at least 10 feet, at least 15 feet, at least 20 feet, at least 25 feet, at least 30 feet, or even at least 35 feet. In another particular embodiment, $L_A$ can be no greater than 75 feet, such as no greater than 60 feet, or even no greater than 45 feet. Selection of a suitable $L_A$:$L_H$ ratio can be dependent on operational application. For example, in pipe cladding operations, the aperture 124 can be sized to accommodate transverse passage of pipe segment into the work space 106 or 108.

In an embodiment, the housing 110 can include two or more apertures 124. In a more particular embodiment, two apertures 124 can be disposed along opposite sides of the housing 110. This can permit passage, for example, of pipe segment, entirely through the work space, i.e., the pipe segment is inserted into the work space 106 or 108 on side 116 and removed from the work space 106 or 108 on side 120. This can accelerate operation of the system 100 by allowing for continuous feed and ejection, e.g., of pipe segments, into and out of the work space 106 or 108.

After arrival at the work site 2, the transportable elements 102 and 104 can be spatially manipulated such that sides 112 of each transportable element 102 and 104 are parallel and aligned with one another. Alternatively, the transportable elements 102 and 104 can be spatially manipulated such that any one of sides 114, 116, 118, 120, or 122 are parallel and aligned between the transportable elements 102 and 104. In an embodiment, alignment of sides 112, 114, 116, 118, 120, or 122 of the transportable elements 102 and 104 can be facilitated by an alignment component 130. The alignment component 130 can provide indication when the transportable elements 102 and 104 are aligned with respect to one another. That is, the alignment component 130 can assist with aligning the transportable elements prior to engaging an engagement component 132 and securing the transportable elements together. In a particular embodiment, the alignment component 126 can indicate to an operator that sides 112, 114, 116, 118, 120, or 122 of each transportable element 102 and 104 are parallel and in alignment with one another, after which time an operator can bring the transportable elements 102 and 104 together. The alignment component 130 can include at least one of a laser, a mechanical component, an electrical component, an electro-mechanical component, or any combination thereof. Exemplary alignment components 130 can include electrically conductive contacts, outwardly extending poles with measurement indicia, lasers aligned to interact with a target or receiver, or any other similar element which may indicate to an operator whether the transportable elements 102 and 104 are properly aligned.

A user interface (not illustrated) or alert system can relay to an operator a misalignment condition between the sides 112, 114, 116, 118, 120, or 122. The user interface or alert system can also indicate degree of misalignment. For example, if the transportable element 102 is angularly misaligned (i.e., side 112, 114, 116, 118, 120, or 122 of the transportable element 102) with respect to the transportable element 104 (i.e., side 112, 114, 116, 118, 120, or 122 of the transportable element 104) by 10°, the user interface or alert system can notify the operator to correct alignment by 10° prior to engaging the engagement component 132. If, for example, the transportable element 102 is laterally misaligned (i.e., side 112, 114, 116, 118, 120, or 122 of the transportable element 102) with respect to the transportable element 104 (i.e., side 112, 114, 116, 118, 120, or 122 of the transportable element 104) by 2 feet, the user interface or alert system can notify the operator to correct alignment by 2 feet prior to engaging the engagement component 132.

In another embodiment, the alignment component 130 can perform alignment automatically, with or without assistance from an operator. That is, alignment of the transportable elements 102 and 104 can be performed at least partially under the power of computer assisted control whereby a logic element (not illustrated) of the alignment component 130 performs alignment with minimal, or no, assistance from an operator.

Upon completion of alignment, sides 112, 114, 116, 118, 120, or 122 of the transportable elements 102 and 104 are aligned and adjacent with one another. At such time, the engageable element 132 can secure the transportable elements 102 and 104 together. The engagement element 132 can include, for example, a clamp, a threaded fastener, a ratcheting system, a ball coupling, or any combination thereof. The engagement element 132 can secure the transportable elements 102 and 104 together such that relative movement therebetween is restricted.

In an embodiment, the engagement element 132 can be permanently or removably coupled to one of the transportable elements 102 or 104. The engagement element 132 can automatically engage with a complementary component on the other transportable element 102 or 104 upon contact therewith. That is, after alignment of the transportable elements 102 and 104, the transportable elements 102 and 104 can be brought together such that the engagement element 132 automatically couples the transportable elements 102 and 104 together. A monitoring device (not illustrated) can monitor and sense an engaged condition, i.e., when the transportable elements 102 and 104 are engaged, and alert operators of the engaged condition. This can allow an operator to move one of the transportable elements 102 or 104 toward the other transportable element 102 or 104 without ramming the transportable elements 102 and 104 together, which can damage the engagement element 132, transportable elements 102 and 104, or both.

Figure 3:
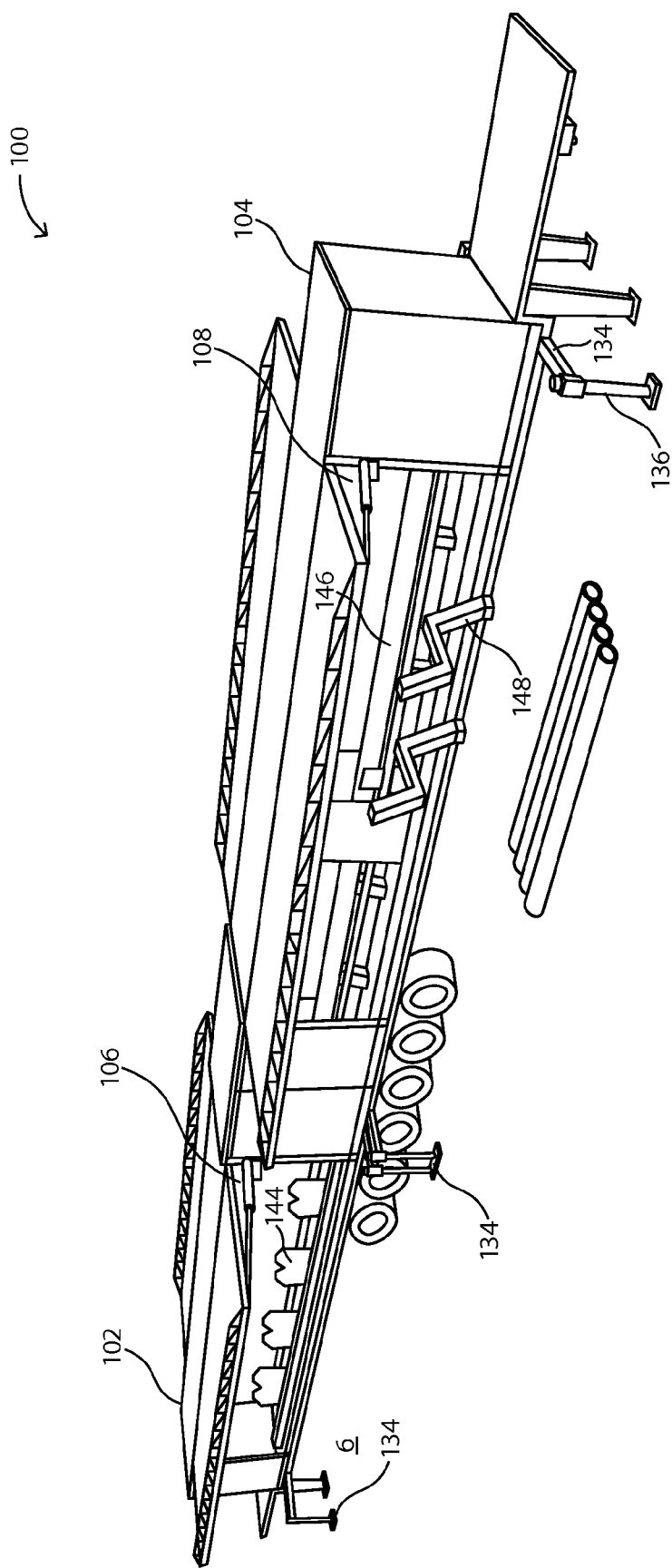
FIG. 3 includes a perspective view of transportable elements, or a work cell, in accordance with an embodiment after deployment at the work site.

Referring to FIG. 3, at least one of the transportable elements 102 and 104 can further include one or more selectively deployable outriggers 134. In a particular embodiment, both transportable elements 102 and 104 include at least one selectively deployable outrigger 134. In a more particular embodiment, both transportable elements 102 and 104 include at least four selectively deployable outriggers 134 uniformly spaced apart, with two outriggers 134 on either side of housing 102. As illustrated, the selectively deployable outriggers 134 can selectively extend outward from the transportable elements 102 and 104 and engage the ground surface 6 at the work site 2. Portions 136 of the outriggers 134 can selectively extend and retract in a vertical direction to engage the ground surface 6.

Prior to deployment, the outriggers 134 can rest within or below the transportable element 102 or 104. The outriggers 134 can be deployed at the work site 2, e.g., pivoted from within or below the transportable element 102 or 104. The outriggers 134 can be brought to an angle approximately perpendicular to the length of the transportable element 102 or 104 and portions 136 can be extended to contact the ground surface 6. After contacting the ground surface 6, one or more of the portions 136 can be further extended as necessary to raise the transportable element 102 or 104 and provide a leveling function, leveling the transportable elements 102 and 104.

In an embodiment, the system 100 can further include a level indicator. The level indicator can be integrally mounted on one or both of the transportable elements 102 or 104. In another embodiment, the level indicator can include a detachable or separate device, independent from the transportable elements 102 and 104. Once the transportable elements 102 and 104 are level, the outriggers 136 can be locked, securing the work spaces 106 and 108 in level alignment.

Referring again to FIG. 1, in a particular embodiment, at least one of the transportable elements 102 or 104 can further include an adjustable system 138 supporting the work space 106 or 108, respectively, and adapted to permit movement of said work space 106 or 108 with respect to the transportable element 102 or 104. In a particular embodiment, each of the transportable elements 102 and 104 can include adjustable systems 138, permitting further leveling and alignment of the work spaces 106 and 108 with respect to each other. The adjustable systems 138 can include, for example, a floating surface attached to the transportable element 102 or 104 by a selectively adjustable mechanism, such as for example, a linear or rotational actuator system, a mechanical system, an elevator system, a scissor elevator, a pulley system, or any other suitable spatial manipulation apparatus. The adjustable system 138 can permit refined arrangement of the work spaces 106 and 108, allowing for coupling or spatial alignment of equipment 140 contained therein. That is, after aligning, leveling, and engaging the transportable elements 102 and 104, further leveling, alignment, or engagement can be performed via the adjustable system 138. This can permit refined repositioning of the equipment 140 within the work spaces 106 and 108 without requiring decoupling of the engagement element 132 and realignment of the transportable elements 102 and 104.

A portion of equipment 140 can be included in each of the work spaces 106 and 108. In an embodiment, all of the equipment 140 can be contained in the work spaces 106 and 108 or work cell. That is, the equipment 140 can be distributed among the work spaces 106 and 108 such that all of the equipment is contained in the work cell.

In an embodiment, the equipment 140 can include a pipe cladding system, such as for example, a pipe cladding assembly supplied by Fronius USA. By way of a non-limiting example, the pipe cladding system can include a welding carriage 144 and a pipe rotator 146. In an embodiment, the welding carriage 144 can be entirely contained within the work space 106 while the pipe rotator 146 can be entirely contained within the work space 108. In another embodiment, one or both the welding carriage 144 and pipe rotator 146 can be partially disposed in each of the work spaces 106 and 108.

During operation, pipe segments can be introduced into the work space 106 or 108 and supplied to the pipe cladding system which can clad the pipe segment, allowing for use of the pipe segment in oil extraction and processing operations. Together, the welding carriage 144 and pipe rotator 146 can perform the pipe cladding operation. That is, the pipe cladding system can clad pipe segments with a protective lining material. This can reduce cost and time associated with shipping otherwise finished but uncladded pipe to a remote pipe cladding company which can be located far from the work site, or even in a different country.

Other equipment disposed in the work spaces 106 and 108 can include: one or more welding heads such as TIG, MIG, or laser heads; column and boom; one or more assemblies for precisely controlling the welding head; one or more system control units including fixed and remote controlled units; an arc control unit for voltage and current detection; a power source; a hotwire power supply; a cooler such as a water cooler; a turning unit or the like; one or more gas containing reservoirs; a carriage for a wire-feeder unit; wire dispensing elements; clamping devices; motors such as servo-motors; electrical harnessing and wires; cameras; displays and interfaces; logic elements; or any other equipment recognizable to those of skill in the art as being suitable for conducting a pipe cladding operation.

In an embodiment, at least one of the transportable elements 102 or 104 can further include a lifting system 148, such as a pipe lifting system. The pipe lifting system 148 can move pipe from a first elevation to an elevation of the equipment 140 (i.e., pipe cladding assembly), the relative elevations being different from one another. The pipe lifting system 148 can include an actuated arm having one or more fingers extending outward to grab pipe segment from a pipe rack or ground surface 6. Actuation of the arm can raise the pipe segment to a higher vertical elevation, whereby the pipe segment can be supplied to the pipe cladding system to be clad.

Many different aspects and embodiments are possible. Some of those aspects and embodiments are described below. After reading this specification, skilled artisans will appreciate that those aspects and embodiments are only illustrative and do not limit the scope of the present invention. Embodiments can be in accordance with any one or more of the items as listed below.

Item 1. A system comprising:
a first transportable element comprising a first work space; and a second transportable element comprising a second work space, wherein:
the first and second work spaces each contain a portion of an equipment,
all of the equipment is contained in the first and second work spaces, and
the first and second work spaces are alignable with one another at the worksite such that the equipment can perform an assembly operation at the worksite, the assembly operation including at least one step performed in the first work space and at least one step performed in the second work space.

Item 2. A system for mobile deployment comprising:
a first transportable element including a first portion of a pipe cladding assembly;
a second transportable element including a second portion of the pipe cladding assembly; and
an engagement component adapted to secure the first and second transportable elements together at a worksite such that the first and second portions of the pipe cladding assembly are aligned, at least one step of cladding pipe is performed in the first portion of the pipe cladding assembly, and at least one step of cladding pipe is performed in the second portion of the pipe cladding assembly.

Item 3. A mobile pipe cladding system comprising:
a first mobile platform comprising a first work space; and
a second mobile platform comprising a second work space,
wherein the first work space and the second workspace together comprise a workcell,
wherein at least one pipe cladding component is disposed within the workcell, and
wherein the first mobile platform and the second mobile platform are configured to be aligned and leveled.

Item 4. The system according to any one of the preceding claims, wherein at least one of the first and second work spaces is enclosed.

Item 5. The system according to any one of the preceding claims, wherein the first transportable element includes a housing enclosing the first work space.

Item 6. The system according to any one of the preceding claims, wherein the second transportable element includes a housing enclosing the second work space.

Item 7. The system according to any one of claims 5 and 6, wherein the housing further comprises:
an aperture; and
a door adapted to selectively close the aperture.

Item 8. The system according to claim 7, wherein the door is pivotable in a vertical direction.

Item 9. The system according to any one of claims 7 and 8, further comprising an actuator adapted to selectively move the door between an open and closed position.

Item 10. The system according to claim 9, wherein the actuator is a hydraulic actuator.

Item 11. The system according to any one of claims 5-10, wherein the housing has a length, $L_H$, wherein the aperture has a length, $L_A$, and wherein $L_A$ is no less than 0.5 $L_H$, such as no less than 0.75 $L_H$, or even no less than 0.9 $L_H$.

Item 12. The system according to any one of claims 7-11, wherein the aperture is sized to accommodate transverse passage of pipe segment into the work space.

Item 13. The system according to any one of the preceding claims, further comprising an engagement component adapted to secure the first and second transportable elements or mobile platforms together.

Item 14. The system according to claim 13, wherein the engagement component comprises a clamp, a threaded fastener, a ratcheting system, or any combination thereof.

Item 15. The system according to any one of claims 13 and 14, wherein the engagement component is coupled to one of the first or second transportable elements or mobile platforms and automatically engageable with a complementary component on the other of the first or second transportable elements or mobile platforms.

Item 16. The system according to any one of the preceding claims, further comprising an alignment component adapted to assist in aligning the first and second work spaces with respect to one another.

Item 17. The system according to claim 16, wherein the alignment component comprises a laser system, a mechanical indicator, an electrical indicator, an electro-mechanical indicator, or any combination thereof.

Item 18. The system according to any one of the preceding claims, wherein:
the first transportable element further comprises an adjustable system supporting the first work space and adapted to permit movement of the first work space with respect to a carriage of the first transportable element or mobile platform;
the second transportable element further comprises an adjustable system supporting the second work space and adapted to permit movement of the second work space with respect to a carriage of the second transportable element or mobile platform; or
a combination thereof.

Item 19. The system according to any one of the preceding claims, wherein at least one of the first and second transportable elements or mobile platforms further includes selectively deployable outriggers.

Item 20. The system according to any one of the preceding claims, wherein the equipment comprises a pipe cladding assembly.

Item 21. The system according to claim 20, wherein the first and second work spaces are aligned to permit longitudinal translation of pipe within the pipe cladding assembly.

Item 22. The system according to any one of claims 20 and 21, wherein a portion of the pipe cladding assembly disposed in one of the first and second work spaces comprises a welding carriage, and wherein a portion of the pipe cladding assembly disposed in the other of the first and second work spaces comprises a pipe rotator.

Item 23. The system according to any one of the preceding claims, wherein at least one of the first and second transportable elements or mobile platforms further comprises:
  a pipe lifting system adapted to move pipe from a first elevation to an elevation of the pipe cladding assembly, the first elevation being different than the elevation of the pipe cladding assembly.

Item 24. A method of deploying an equipment comprising:
  providing a first transportable element including a first work space, a second transportable element including a second work space, the first and second work spaces each containing a portion of equipment;
  aligning the first and second transportable elements at a fixed relative location with respect to one another such that longitudinal ends of the first and second transportable elements are disposed adjacent to one another; and
  utilizing an engagement component to couple the first and second transportable elements together at the fixed relative location with respect to one another.

Item 25. A method of deploying a mobile pipe cladding system comprising:
  providing a first mobile platform including a first work space, a second mobile platform including a second work space, the first and second work spaces each containing a portion of equipment;
  aligning the first and second mobile platforms at a fixed relative location with respect to one another such that longitudinal ends of the first and second mobile platforms are disposed adjacent to one another; and
  coupling the first and second mobile platforms together at the fixed relative location with respect to one another using an engagement component.

Item 26. The method according to any one of claims 24 and 25, further comprising: aligning the first and second work spaces at a fixed relative location with respect to one another.

Item 27. The method according to any one of claims 24-26, further comprising: individually transporting the first and second transportable elements or mobile platforms to a worksite.

Item 28. The method according to any one of claims 24-27, further comprising: deploying at least one outrigger of the first or second transportable elements or mobile platforms after aligning the first and second transportable elements or mobile platforms.

Note that not all of the features described above are required, that a portion of a specific feature can not be required, and that one or more features can be provided in addition to those described. Still further, the order in which features are described is not necessarily the order in which the features are installed.

Certain features are, for clarity, described herein in the context of separate embodiments, can also be provided in combination in a single embodiment. Conversely, various features that are, for brevity, described in the context of a single embodiment, can also be provided separately or in any subcombinations.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments can also be provided in combination in a single embodiment, and conversely, various features that are, for brevity, described in the context of a single embodiment, can also be provided separately or in any subcombination. Further, reference to values stated in ranges includes each and every value within that range. Many other embodiments can be apparent to skilled artisans only after reading this specification. Other embodiments can be used and derived from the disclosure, such that a structural substitution, logical substitution, or any change can be made without departing from the scope of the disclosure. Accordingly, the disclosure is to be regarded as illustrative rather than restrictive.

What is claimed is:

1. A mobile pipe cladding system comprising:
  a first separately transportable element comprising a first housing defining a first work space;
  a second separately transportable element comprising a second housing defining a second work space, and
  an engagement component,
  wherein:
    a first portion of a pipe cladding assembly, including at least a welding carriage, is installed in the first work space,
    a second portion of the pipe cladding assembly, including at least a pipe rotator, is installed in the second work space,
    the engagement component secures the first and second separately transportable elements together to form a work cell,
    the entire pipe cladding assembly is contained within the work cell,
    the welding carriage and pipe rotator are level and aligned
    the pipe cladding assembly is capable of loading pipe segments of at least 40 ft. length.

2. The system according to claim 1, wherein at least one of the separately transportable elements includes a pipe lifting system.

3. The system according to claim 2, further comprising:
  an aperture disposed on a lateral surface of the first housing; and
  a door adapted to selectively close the aperture.

4. The system according to claim 1, further comprising:
  an alignment component adapted to assist in aligning the first and second work spaces with respect to one another.

5. The system according to claim 1, wherein at least one of the first and second work spaces further comprises:

an adjustable system supporting the work space and adapted to permit movement of the work space with respect to a carriage of the first transportable element.

6. The system according to claim 1, wherein at least one of the first and second transportable elements further includes selectively deployable outriggers.

7. A mobile pipe cladding system comprising:
a first tractor trailer defining a first work space; and
a second tractor trailer defining a second work space,
wherein a first portion of a pipe cladding assembly, including at least a welding carriage, is installed in the first tractor trailer,
a second portion of the pipe cladding assembly, including at least a pipe rotator, is installed in the second tractor trailer,
wherein the first tractor trailer and the second tractor trailer are coupled together so that the first work space and the second workspace-join together to comprise a workcell,
wherein the first an second portions of the pipe cladding assembly are coupled together level and aligned within the workcell
wherein the first tractor trailer and the second tractor trailer are aligned and, and
wherein the pipe cladding assembly is capable of loading pipe segments that are at least 40 ft. in length.

8. The system according to claim 7, further comprising an engagement component adapted to removably secure the first and second tractor trailers together.

9. The system according to claim 8, wherein the engagement component comprises at least one of a clamp, a threaded fastener, or a ratcheting system.

10. The system according to claim 7, further comprising an alignment component adapted to assist in aligning the first and second tractor trailers with respect to one another, wherein the alignment component comprises a laser system, a mechanical indicator, an electrical indicator, an electro-mechanical indicator, or any combination thereof.

11. The system according to claim 7, wherein at least one of the first and second tractor trailers further comprises:
an adjustable system supporting the work space and adapted to permit movement of the work space with respect to a carriage of the tractor trailer.

12. The system according to claim 7, wherein at least one of the first and second tractor trailers further comprises:
a pipe lifting system adapted to move pipe segments of at least 40 ft. in length from a first elevation to an elevation of the pipe cladding assembly, the first elevation being different than the elevation of the pipe cladding assembly.

13. A method of deploying a mobile pipe cladding system at a work site comprising:
providing a first housing enclosing a first work space and a second housing enclosing a second work space, wherein a first portion of a pipe cladding assembly, including at least a welding carriage, is installed in the first work space, and a second portion of the pipe cladding assembly, including at least a pipe rotator, is installed in the second work space;
transporting the first housing to the work site;
transporting the second housing to the work site;
aligning the first housing and the second housing at a fixed relative location with respect to one another such that longitudinal ends of the first housing and the second housing are disposed adjacent to one another;
coupling the first housing and the second housing together at the fixed relative location with respect to one another using an engagement component; and
performing a pipe cladding operation within the first and second work spaces on a pipe segment that is at least 40 ft. in length.

* * * * *